United States Patent
Kakuchi

(10) Patent No.: US 12,455,324 B2
(45) Date of Patent: Oct. 28, 2025

(54) SYSTEM TO SUPPORT REUSE OF SECONDARY BATTERY, SERVER USED THEREIN, AND METHOD

(71) Applicant: TOYOTA JIDOSHA KABUSHIKI KAISHA, Toyota (JP)

(72) Inventor: Makoto Kakuchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 470 days.

(21) Appl. No.: 18/090,939

(22) Filed: Dec. 29, 2022

(65) Prior Publication Data

US 2023/0296689 A1 Sep. 21, 2023

(30) Foreign Application Priority Data

Mar. 17, 2022 (JP) ................. 2022-043081

(51) Int. Cl.
*G06F 11/30* (2006.01)
*G01R 31/367* (2019.01)
*G01R 31/385* (2019.01)
*G01R 31/392* (2019.01)

(52) U.S. Cl.
CPC ......... *G01R 31/392* (2019.01); *G01R 31/367* (2019.01); *G01R 31/385* (2019.01)

(58) Field of Classification Search
CPC .................................................. G01R 31/392
See application file for complete search history.

(56) References Cited

U.S. PATENT DOCUMENTS

2009/0276172 A1 11/2009 Nishi
2021/0339653 A1* 11/2021 Yamamoto .......... H01M 50/204

FOREIGN PATENT DOCUMENTS

| | | |
|---|---|---|
| EP | 4044077 A1 | 8/2022 |
| JP | 2007195312 A | 8/2007 |
| JP | 2008058278 A | 3/2008 |
| JP | 2020113507 A | 7/2020 |
| JP | 2021124982 A | 8/2021 |
| JP | 2021131671 A | 9/2021 |
| WO | WO-2021157346 A1 * | 8/2021 ......... G06Q 30/0283 |
| WO | WO-2025109894 A1 * | 5/2025 |

* cited by examiner

*Primary Examiner* — Phuong Huynh
(74) *Attorney, Agent, or Firm* — Dinsmore & Shohl LLP

(57) ABSTRACT

A system to support reuse of a mounted secondary battery mounted on a vehicle includes at least one processor. The at least one processor is configured to acquire supply time information on supply time of a used secondary battery that will be removed from the vehicle and first battery performance information on battery performance of the mounted secondary battery mounted on the vehicle, and generate supply information on supply of a used secondary battery, including battery performance of the used secondary battery at the supply time, in accordance with the supply time information and the first battery performance information.

8 Claims, 3 Drawing Sheets

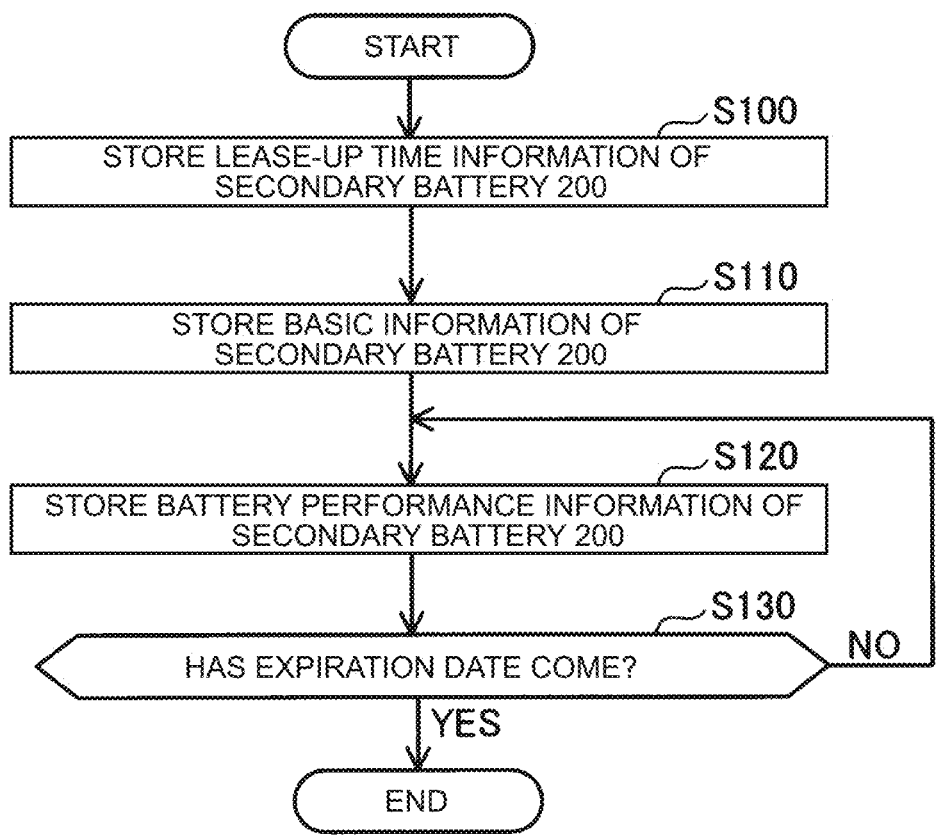
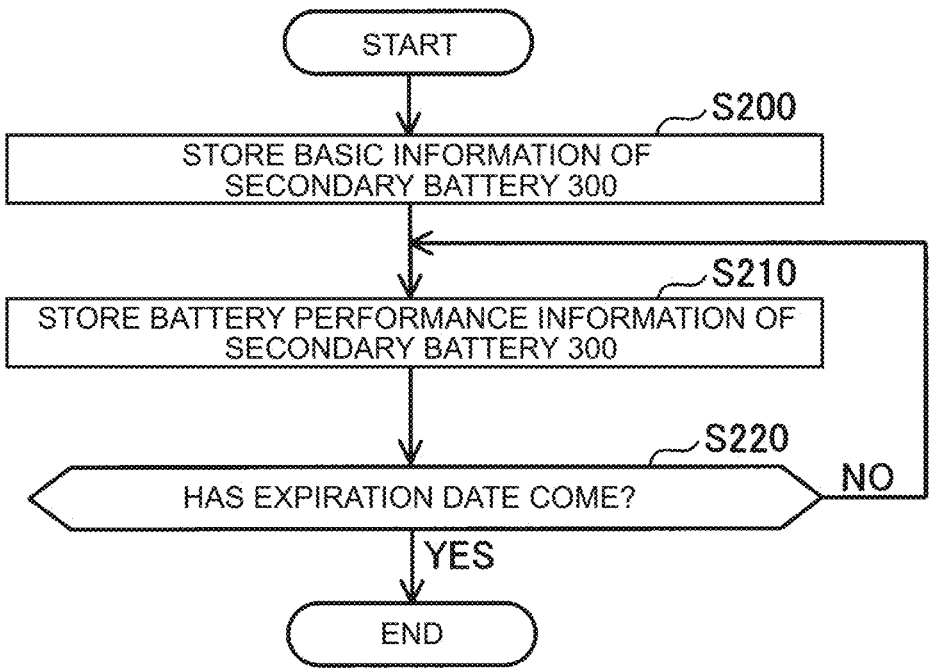

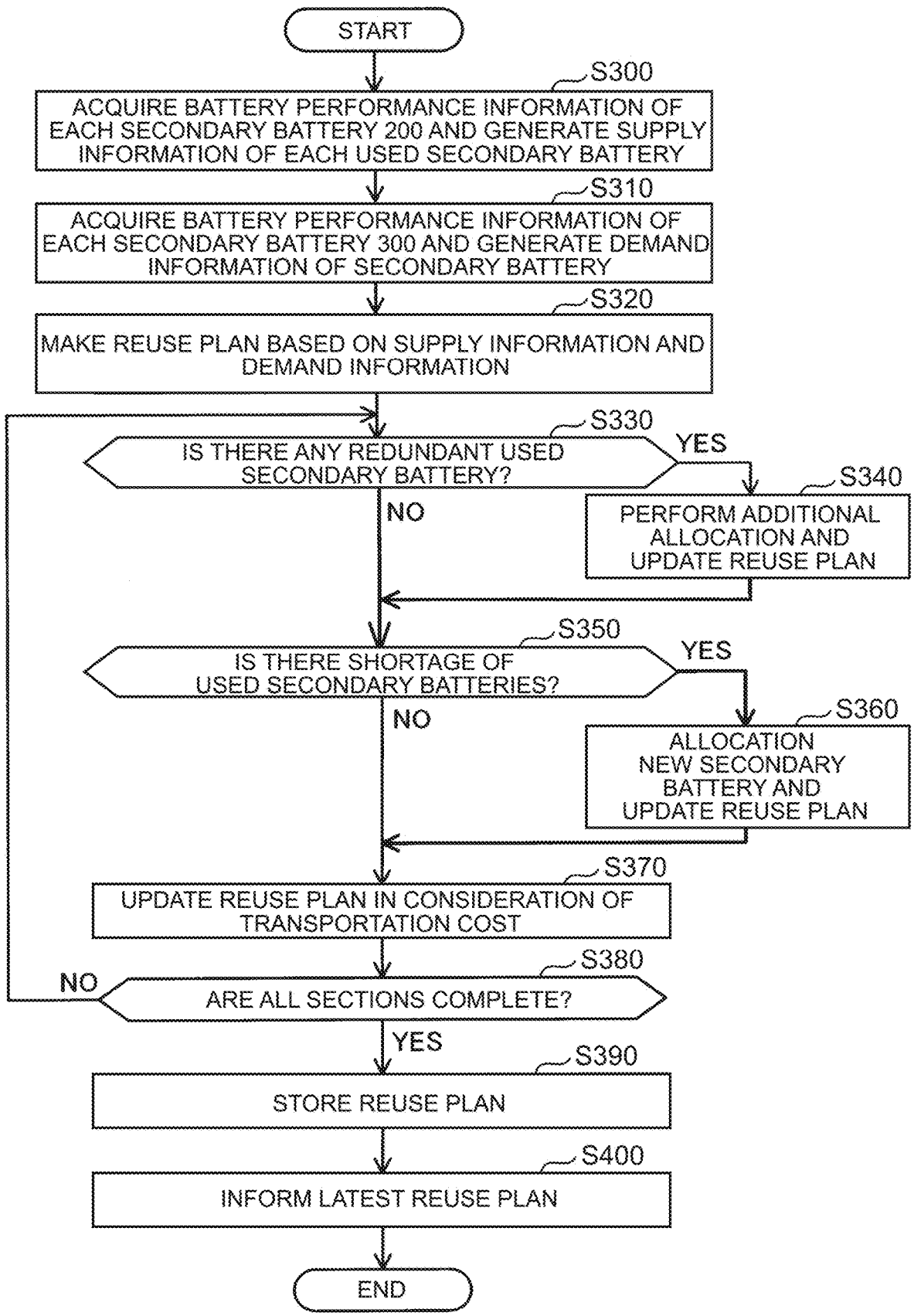

SYSTEM TO SUPPORT REUSE OF SECONDARY BATTERY, SERVER USED THEREIN, AND METHOD

CROSS-REFERENCE TO RELATED APPLICATION

This application claims priority to Japanese Patent Application No. 2022-043081 filed on Mar. 17, 2022, incorporated herein by reference in its entirety.

BACKGROUND

1. Technical Field

The disclosure relates to a system to support reuse a secondary battery mounted on a vehicle, a server used therein, and a method.

2. Description of Related Art

In recent years, electrified vehicles, such as hybrid electric vehicles (HEVs and PHEVs) and battery electric vehicles (BEVs), are equipped with secondary batteries for storing drive electric power. Secondary batteries degrade over time. However, even after such electrified vehicles have become end-of-life vehicles, secondary batteries can still have sufficient service life.

Secondary batteries mounted on vehicles are mostly configured as secondary battery packs (hereinafter, simply referred to as battery packs) in each of which a plurality of secondary battery modules (hereinafter, simply referred to as battery modules) made up of a predetermined number of modularized cells are combined. There has been suggested a system that distributes battery modules of such battery packs to reuse battery modules one by one (Japanese Unexamined Patent Application Publication No. 2020-113507 (JP 2020-113507 A)). The system estimates the degree of degradation of each battery module in battery packs collected from vehicles. On the other hand, the system predicts demand for replacement of battery modules in various sites and vehicle types. Here, the criteria of battery performance (degree of degradation) of battery modules available for repair vary depending on a site and a vehicle type. For this reason, the system distributes battery modules with battery performance (degree of degradation) needed at a site to the site and the vehicle type, from which a repair demand is predicted.

SUMMARY

In the above-described system according to the existing technology, battery packs mounted on end-of-life vehicles are collected and then the degree of degradation of the battery performance is acquired. Therefore, the performance and the number of available battery modules are acquired for the first time when battery packs are collected, and then demand for battery modules of secondary batteries is adjusted for supply and demand. Therefore, at the time of collecting battery packs, demand may be excessive or supply may be excessive, so the balance between supply and demand is not ensured. Because of such an imbalance between supply and demand, it has been difficult to promote reuse of secondary batteries collected.

The disclosure provides a technology to further accurately adjust supply and demand of used secondary batteries by predicting time when secondary batteries are removed from vehicles equipped with secondary batteries and estimating the battery performance of the secondary batteries at that time.

A first aspect of the disclosure is implemented by a system to support reuse of a mounted secondary battery mounted on a vehicle. The system includes at least one processor. The at least one processor is configured to acquire supply time information on supply time of a used secondary battery that will be removed from the vehicle and first battery performance information on battery performance of the mounted secondary battery mounted on the vehicle. The at least one processor is configured to generate supply information on supply of the used secondary battery, including battery performance of the used secondary battery at the supply time, in accordance with the supply time information and the first battery performance information. The at least one processor is further configured to acquire demand information on demand for a reuse secondary battery, including battery performance of the reuse secondary battery that will be needed at demand time of the reuse secondary battery from a secondary battery reuse user.

With the above-described configuration, the system, different from the existing one, is able to acquire in advance supply time of a used secondary battery, which will come in the future, and supply information on battery performance of the used secondary battery at the supply time. A potential excess or shortage of supply of used secondary batteries is able to be predicted from such supply information and demand information, so measures taken to eliminate such an excess or shortage are able to be planned in advance, with the result that it is possible to promote reuse of secondary batteries.

A second aspect of the disclosure is implemented by another system to support reuse of a mounted secondary battery mounted on a vehicle. The system includes at least one processor. The at least one processor is configured to acquire supply time information on supply time of a used secondary battery that will be removed from the vehicle and first battery performance information on battery performance of the mounted secondary battery mounted on the vehicle. The at least one processor is configured to generate supply information on supply of the used secondary battery, including battery performance of the used secondary battery at the supply time, in accordance with the supply time information and the first battery performance information.

A third aspect of the disclosure is implemented by a server to support reuse of a mounted secondary battery mounted on a vehicle. The server includes a database configured to store supply time information on supply time of a used secondary battery that will be removed from the vehicle and first battery performance information on battery performance of the mounted secondary battery mounted on the vehicle. The server includes an information processing device configured to generate supply information on supply of the used secondary battery, including battery performance of the used secondary battery at the supply time, in accordance with the supply time information and the first battery performance information.

In the server, the database may be further configured to store demand information on demand for a reuse secondary battery, including battery performance of the reuse secondary battery that will be needed at demand time of the reuse secondary battery from a secondary battery reuse user.

A fourth aspect of the disclosure is implemented by a method to support reuse of a mounted secondary battery mounted on a vehicle. The method includes acquiring, by at least one processor, supply time information on supply time of a used secondary battery that will be removed from the vehicle and first battery performance information on battery performance of the mounted secondary battery mounted on the vehicle. The method includes generating, by the at least one processor, supply information on supply of the used secondary battery, including battery performance of the used secondary battery at the supply time, in accordance with the supply time information and the first battery performance information.

With the above-described configuration, the system, the server, and the method are able to acquire in advance supply time of a used secondary battery, which will come in the future, and supply information on battery performance of the used secondary battery at the supply time. By using such supply information, various methods can be planned to produce and distribute future secondary batteries, so it is possible to promote reuse of secondary batteries.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart that shows an example of a process in a server of the reuse support system for secondary batteries;

FIG. 3 is a flowchart that shows an example of a process in the server of the reuse support system for secondary batteries; and FIG. 4 is a flowchart that shows an example of a process in the server of the reuse support system for secondary batteries.

DETAILED DESCRIPTION OF EMBODIMENTS

Figure 1:
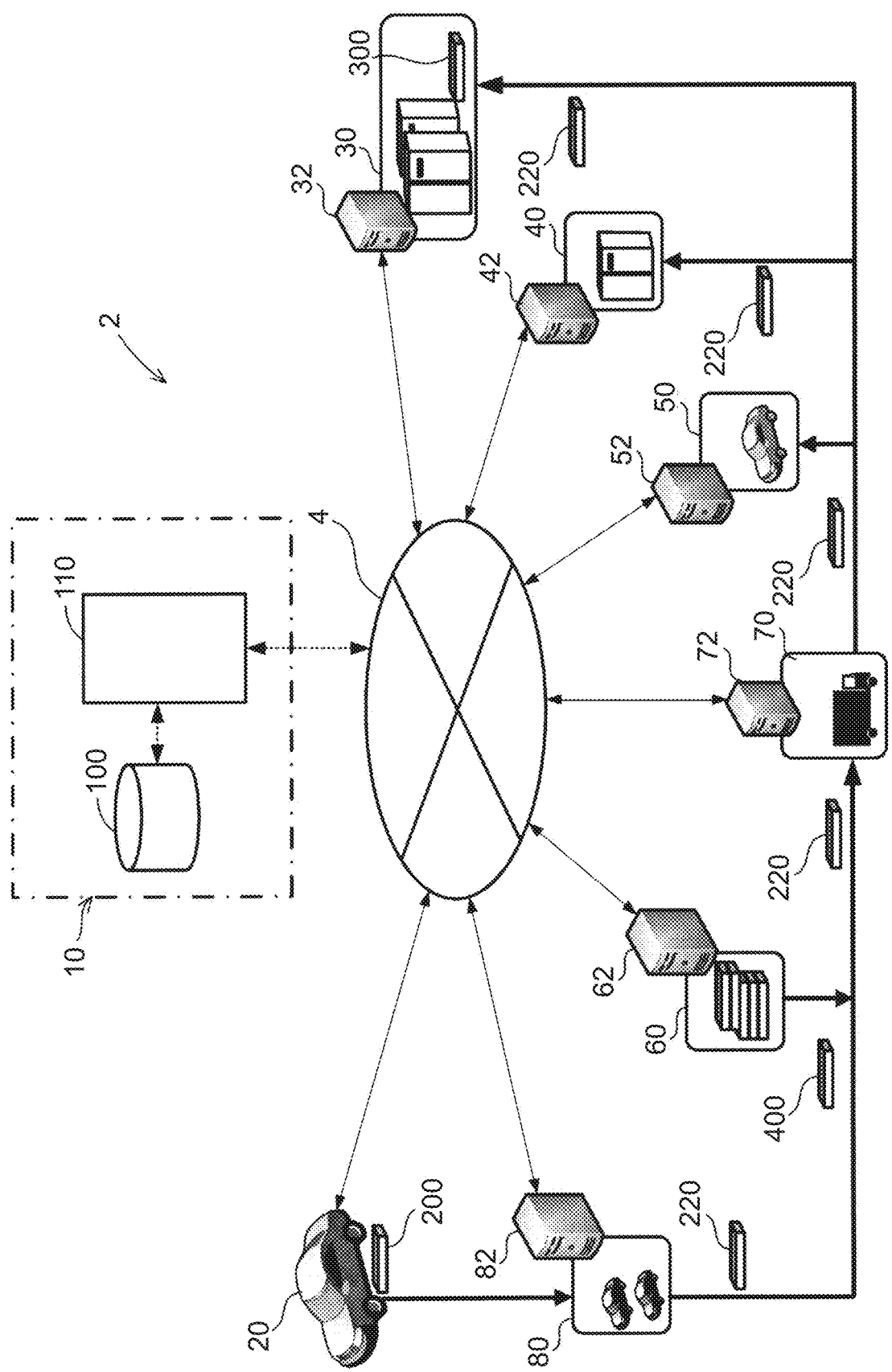
FIG. 1 is a schematic diagram of an example of a network including a reuse support system for secondary batteries.

In one embodiment of the disclosure, the at least one processor of the system may be configured to acquire second battery performance information on battery performance of the reuse secondary battery that will be used by the secondary battery reuse user, and the at least one processor may be configured to generate the demand information in accordance with the second battery performance information. With such a configuration, demand information on the demand time and the like of a reuse secondary battery from a secondary battery reuse user is obtained with further higher accuracy. Therefore, reuse of used secondary batteries is further promoted.

In one embodiment of the disclosure, the at least one processor may be configured to make a reuse plan to allocate the used secondary battery to the reuse secondary battery for the secondary battery reuse user to reuse, by comparing the supply information with the demand information. With such a configuration, by allocating a used secondary battery to a reuse secondary battery for a secondary battery reuse user in advance, the used secondary battery is reliably reused, and the secondary battery reuse user is able to safely keep a replacement secondary battery.

In one embodiment of the disclosure, the at least one processor may be configured to make the reuse plan including producing a new secondary battery, when the used secondary battery is insufficient as a result of comparing the supply information with the demand information. With such a configuration, secondary batteries can be produced in advance, so a shortage of supply of used secondary batteries is easily avoided.

In one embodiment of the disclosure, the at least one processor may be configured to make the reuse plan in consideration of transportation cost to be incurred between a supply location of the used secondary battery and a demand location of the reuse secondary battery from the secondary battery reuse user. With such a configuration, reuse of used secondary batteries is efficiently promoted by reducing energy consumption for reuse.

In one embodiment of the disclosure, the vehicle may include a leased vehicle, and the supply time information may include information based on time that the lease expires. With such a configuration, the supply time of a used secondary battery is kept track of with high accuracy. Therefore, further reliable measures for improving the demand-and-supply balance of used secondary batteries, such as a reuse plan, can be made.

In one embodiment of the disclosure, the secondary battery reuse user may include a user that uses the used secondary battery in at least a stationary electrical storage device. With such a configuration, a user of a stationary electrical storage device is a user that uses a large number of secondary batteries and is capable of avoiding a shutdown with high possibility. Therefore, by setting such users for reuse sites of used secondary batteries, secondary batteries are effectively used, while reliable operations of electrical storage devices are ensured.

In the server according to one embodiment of the disclosure, the database may be further configured to store demand information on demand for a reuse secondary battery, including battery performance of the reuse secondary battery that will be needed at demand time of the reuse secondary battery from a secondary battery reuse user. By configuring the database in this way, a potential excess or shortage of supply of used secondary batteries is able to be predicted, so measures taken to eliminate such an excess or shortage are able to be planned in advance, with the result that it is possible to promote reuse of secondary batteries.

Hereinafter, a system that supports reuse of secondary batteries mounted on vehicles will be described with reference to the accompanying drawings as needed. The system is applied to, for example, vehicles each subjected to a use agreement with conditions including a period of use and equipped with secondary batteries. Here, the type of use agreement is not limited. Examples of the type of use agreement include a lease and a subscription. Vehicles are not limited as long as the vehicles are equipped with secondary batteries. Examples of the vehicles are vehicles equipped with drive secondary batteries and include hybrid electric vehicles (HEVs and PHEVs), battery electric vehicles (BEVs), and fuel cell electric vehicles (FCEVs). Secondary batteries are not limited. Examples of the secondary batteries include lithium ion secondary batteries and nickel-metal hydride secondary batteries.

In the following description, a secondary battery in a simple term may actually mean a battery pack in which a plurality of battery modules is combined or one or more battery modules separated from battery packs.

In the following description, the word "reuse" of secondary batteries includes reuse and rebuild of secondary batteries. Reuse is intended to use collected battery packs in a state without being processed. Rebuild is intended to once disassemble battery packs into battery modules and use new battery packs made by combining usable battery modules and other battery modules with one another.

FIG. 1 shows component elements related to a system that supports users to reuse lithium ion secondary batteries (hereinafter, simply referred to as secondary batteries) 200 of hybrid electric vehicles (HEVs) (hereinafter, simply referred to as vehicles) 20 equipped with the secondary batteries 200 in accordance with leases that define periods of use (hereinafter, also simply referred to as system). A reuse user 30 in the system 2 is a business operator that manages maintenance of electrical storage devices. A user 40 is an electrical storage device manufacturer. A user 50 is a vehicle manufacturer.

The system 2 shown in FIG. 1 includes one server 10 and is configured to be capable of communicating with each individual vehicle 20, user 30, and the like via a communication network 4. The communication network 4 is a communication network of the Internet. The communication network may be a known wireless or wired communication network, such as a local area network (LAN), a mobile communication network, other networks, and a combination of some of these networks.

The vehicle 20 in FIG. 1 represents one or more vehicles. The vehicle in the specification means one or more vehicles. The user 30 and the like and various business operators 60, 70, 80 in FIG. 1 each represent one or more business operators. The user 30 and the like and various business operators 60, 70, 80 in the specification each mean one or more companies.

The system 2 is made up of a server 10, the vehicle 20, the users 30, 40, 50, a battery manufacturer 60 that is a secondary battery manufacturer, and a carrier 70 that is a carrier for secondary batteries and the like, each are configured to be capable of connecting with each other via the communication network 4 and the server 10. The secondary battery-mounted vehicle dealer 80 is also configured to be capable of connecting with the vehicle 20, the users 30, 40, 50, the battery manufacturer 60, and the carrier 70 via the communication network 4 and the server 10.

The component elements other than the server 10 each include a computer having at least one processor for exchanging information and the like via the communication network 4 and the server 10.

Hereinafter, initially, the schematic configuration of the server 10 of the system 2 will be described, individual component elements will be described, and then a process of operations in the server 10 and the flow of used secondary batteries will be described.

Server

The server 10 is a computer including at least one processor and a memory. The server 10 is configured to be capable of connecting with the communication network 4. More specifically, the server 10 includes a database (storage device) 100 related to supply and demand of secondary batteries, and an information processing device (hereinafter, simply referred to as processing device) 110. The server 10 includes a communication device (not shown) that enables communication with other component elements via the communication network 4.

The database 100 receives various pieces of information from the vehicle 20, the users 30, 40, 50, the battery manufacturer 60, the carrier 70, the vehicle dealer 80, and the like via the processing device 110 and stores the various pieces of information.

The processing device 110 executes a process of predicting the battery performance of a used secondary battery 220 at supply time (secondary battery 200 of which supply time has come) by using information on the secondary battery 200, received from the vehicle 20 and stored in the database 100. The processing device 110 executes a process of predicting the life and demand time of a secondary battery 300 by using information received from the user 30 and stored in the database 100. The processing device 110 executes a process of making a reuse plan related to allocation and the like of a reuse site of the used secondary battery 220 in accordance with these processes. The details of the process will be described later.

Vehicle and Secondary Battery Mounted on Vehicle

The vehicle 20 is equipped with the secondary battery 200 for driving and includes a battery electrical control unit (ECU) that controls monitoring of the secondary battery 200. The vehicle 20 is capable of communicating with the server 10 via the battery ECU or a CPU of the vehicle 20.

The vehicle 20 transmits information on the lease-up time of the secondary battery 200 to the server 10. Lease-up time information on the lease-up time of the vehicle 20 is an example of the supply time information according to the disclosure. The secondary battery 200 is removed from the vehicle 20 on expiration of the lease period, that is, on lease-up, and is reusable as a used secondary battery 220. Information on lease-up time is, for example, stored in the CPU or the like of the vehicle 20 in advance.

Basic information of the secondary battery 200 is configured to be transmitted to the server 10 at appropriate time together with the lease-up time information. The basic information contains, for example, the type of the battery, the configuration of the battery, the origin of material, manufacturer, manufacturing time (for example, date of manufacture), and a lot number or the like. These pieces of basic information can relate to the battery performance of the secondary battery 200 and may be part of the first battery performance information according to the disclosure.

The vehicle 20 transmits the information on the battery performance of the secondary battery 200 from the vehicle 20 to the server 10. The secondary battery 200 is formed by combining a plurality of battery modules. In each individual battery module, a sensor that detects the temperature, voltage, current, and the like of each battery module or each plurality of cells in the battery module is provided in advance. Information on the battery performance of the secondary battery 200 (temperature, voltage, current, and the like) periodically acquired from these sensors is transmitted to the server 10. The information on the battery performance of the secondary battery 200 is an example of the first battery performance information according to the disclosure.

Electrical Storage Device User and Secondary Batteries in Electrical Storage Device The user 30 is a business operator that owns or manages an electrical storage device made up of a plurality of the secondary batteries 300. The user 30 owns a computer 32 that manages maintenance of the secondary batteries 300 of the electrical storage device and manages the demand times and the like of used secondary batteries 220. The user 30 may include expansion slots for secondary batteries in the electrical storage device. Thus, even before the battery life of the secondary batteries 300 expires, the secondary batteries 300 can be set for sites to which the secondary batteries 220 are allocated in the case where there are some redundant used secondary batteries 220, so the used secondary batteries 220 are kept in advance. On the other hand, storage costs by the vehicle dealer 80 or the carrier 70 are reduced.

The computer 32 transmits the basic information of each secondary battery 300 to the server 10 via the computer 32 or the like as basic information unique to the secondary battery. The basic information contains, for example, the type of the battery, the configuration of the battery, the origin of material, manufacturer, manufacturing time (for example, date of manufacture), and a lot number, or the like. In addition, when the secondary battery 300 is a reuse product, the basic information contains the battery performance (for example, battery life (remaining operating time)) at the beginning of reuse, and the like. These pieces of basic information can relate to the battery performance of the secondary battery 300 and may be part of the second battery performance information according to the disclosure.

The computer 32 transmits information on the battery performance of each secondary battery 300 to the server 10. As in the case of the secondary battery 200, in each individual battery module of each secondary battery 300, a sensor that detects the temperature, voltage, current, and the like of each battery module or each set of cells in the battery module is provided in advance. Information on the battery performance of each secondary battery 300, periodically acquired from these sensors, is transmitted to the server via the computer 32 and the like. The information on the battery performance of each secondary battery 300 is an example of the second battery performance information according to the disclosure.

Electrical Storage Device Manufacturer

The user 40 that is an electrical storage device manufacturer manufactures or rebuilds new electrical storage devices by using used secondary batteries 220 or part of each of the used secondary batteries 220. The user 40 has a computer 42 that manages a production plan and the like of electrical storage devices. The computer 42 transmits information on used secondary batteries with battery performance appropriate for the production plan of the electrical storage devices, demand times, and the like to the server 10. The computer 42 receives, from the server 10, information on the supply times of the used secondary batteries 220 and the specifications of the secondary batteries 220.

Vehicle Manufacturer

The user 50 that is a vehicle manufacturer manufactures or rebuilds vehicles by using used secondary batteries 220 or part of each of the used secondary batteries 220 as secondary batteries or part of each of the secondary batteries of new vehicles. The user 50 has a computer 52 that manages a production plan and the like of vehicles. The computer 52 is capable of transmitting, to the server 10, information on used secondary batteries with battery performance appropriate for the production plan of the vehicles, demand times, and the like and receiving, from the server 10, information on the supply times of the used secondary batteries and the battery performance (specifications) of the secondary batteries.

Secondary Battery Manufacturer

The battery manufacturer 60 manufactures secondary batteries, including secondary batteries to be mounted on vehicles and/or secondary batteries to be used in electrical storage devices. The battery manufacturer 60 has a computer 62 that makes and manages a production plan or the like for secondary batteries. The server 10 and the computer 62 are configured to be capable of transmitting and receiving information such as a production plan for new secondary batteries 400 to and from each other.

Carrier for Secondary Batteries and Others

The carrier 70 for secondary batteries and the like is a business operator that, for example, transports used secondary batteries 220 removed from vehicles 20 or part of each of the used secondary batteries 220, newly produced secondary batteries 400, and the like. The business operator 70 has a computer 72 that manages collection and delivery of secondary batteries 200 and the like. The computer 72 receives, from the server 10, information on sites from which secondary batteries 220 are collected and sites to which new secondary batteries 400 produced by the battery manufacturer 60 are delivered.

The server 10 is connected so as to be communicable with a computer 82 of the vehicle dealer 80. The computer 82 is capable of transmitting, to the server 10, information and the like on lease-up time and the like of leased vehicles 20 and receiving, from the server 10, demand information, such as reuse sites of secondary batteries 200 of the vehicles 20.

The server 10 may be further connected so as to be communicable with a computer of an external business operator. The external business operator is a business operator that uses supply information of used secondary batteries and/or demand information of used secondary batteries, which is acquired and stored by the server 10. The external business operator is not limited and may be, for example, a system of a business operator concerned with energy-related business, mobile unit-related business, and the like that support reuse of secondary batteries. The computer of the external business operator is capable of receiving, from the server 10, information on supply and demand of used secondary batteries.

Next, a process of making a reuse plan including allocation of reuse sites of used secondary batteries 220 will be described as an example of a process that the information processing device 110 of the server 10 executes. FIG. 2 is an example of a process of acquiring information from the vehicle 20 and processing using the acquired information in the server 10. FIG. 3 is an example of a process of acquiring information from the user 30 and processing using the acquired information in the server 10. FIG. 4 is an example of a process in the server 10.

In step S100 of the process shown in FIG. 2, the processing device 110 receives lease-up time information of the secondary battery 200 mounted on the vehicle 20 and stores the lease-up time information in the database 100. In step S110, the processing device 110 receives the basic information of the secondary battery 200 and stores the basic information in the database 100.

Subsequently, in step S120, the processing device 110 receives, from the vehicle 20, information on the current battery performance of the secondary battery 200 and stores the information in the database 100. The processing device 110 repeats reception of the battery performance for a set period and ends the reception by the time a set period before the lease-up time comes (step S130).

Through the above process, the database 100 stores temporal changes in the battery performance of the secondary battery 200 that will be removed in the future.

On the other hand, as shown in FIG. 3, in step S200, the processing device 110 receives, from the computer 32 of the user 30, the basic information of the secondary battery 300 that is a component of an electrical storage device and stores the basic information in the database 100.

Subsequently, in step S210, the processing device 110 receives, from the computer 32 of the user 30, the information on the current battery performance of the secondary battery 300 and stores the information in the database 100. The processing device 110 repeats acquisition of the battery performance for a set period and then ends the acquisition by the time a set period before the general service life of the secondary battery 300 expires (step S220).

Through the above process, the database 100 stores temporal changes in the battery performance of the secondary battery 300 that will need replacement in the future.

Next, FIG. 4 will be described. In step S300, the processing device 110 acquires, from the database 100, the battery performance information of each secondary battery 200, predicts the battery performance of each used secondary battery 220 at lease-up time, and generates supply information of each used secondary battery. For example, the processing device 110 predicts the battery performance (state of degradation) of each used secondary battery 220 at the lease-up time from temporal changes in battery performance in a set period before lease-up of the secondary battery 200. To predict the state of degradation of a secondary battery of this type, for example, not only Japanese Unexamined Patent Application Publication No. 2007-195312 (JP2007-195312 A), Japanese Unexamined Patent Application Publication No. 2008-058278 (JP 2008-058278), and the like but also a known method is applicable as needed.

In step S310, the processing device 110 acquires the battery performance information of each secondary battery 300 from the database 100, predicts the life (replacement time) of each secondary battery 300 in accordance with the battery performance information, and generates demand information of a secondary battery. The processing device 110 predicts the battery life of each secondary battery 300 from temporal changes in battery performance in a predetermined set period. A battery life expires when, for example, the battery performance of the secondary battery 300 becomes lower than a battery performance reference applied to an electrical storage device. The secondary battery demand information contains the battery performance of a secondary battery like the above-described battery performance reference needed to replace the secondary battery 300. To predict the state of degradation of a secondary battery of this type, as in the case of the above, a known technology is applicable as needed.

In step S320, the processing device 110 compares the supply information of each used secondary battery with the demand information of each secondary battery. Specifically, the processing device 110 makes a supply schedule of used secondary batteries by using the supply times of the used secondary batteries 220 and the battery performance of each used secondary battery 220 to be supplied. The supply schedule includes, for example, the lease-up time of each used secondary battery 220 classified according to the rank of predetermined battery performance (degree of degradation) and the number of the used secondary batteries to be classified into the ranks. More specifically, the supply schedule includes when and how much A-rank used secondary batteries are supplied.

The processing device 110 makes a secondary battery demand schedule by using demand times of secondary batteries and battery performance needed. The demand schedule includes, for example, the demand times of secondary batteries to be classified into the ranks of predetermined battery performance according to the rank as in the case of the above and the number of secondary batteries. More specifically, the demand schedule contains when and how much the demand schedule needs A-rank secondary batteries.

The processing device 110 makes a reuse plan of used secondary batteries by comparing the supply schedule with the demand schedule and allocating the used secondary batteries 220 supplied from the vehicles 20 to secondary batteries needed by the user 30.

Subsequently, in step S330, the processing device 110 divides the reuse plan into a plurality of sections along the time axis and, in each section, determines an excess or shortage of supply and demand of used secondary batteries 220 in the section. When there is a redundant used secondary battery 220, the processing device 110, in step S340, acquires the production plan and the like of electrical storage devices from the user 40 and the production plan and the like of vehicles from the user 50. The processing device 110 allocates the redundant used secondary battery 220 to an additional reuse site in accordance with these pieces of information and updates the reuse plan.

On the other hand, when the used secondary batteries 220 are insufficient in step S350, the processing device 110, in step S360, updates the reuse plan by allocating a newly manufactured secondary battery 400 to the battery manufacturer 60 as a secondary battery intended for the user 30.

Subsequently, in step S370, the processing device 110 updates the reuse plan in accordance with the distance and transport device between a supply location of used secondary batteries 220 and a place (demand location) of reuse site of used secondary batteries, transportation volume, and the like such that transportation cost is reduced. In order for the processing device 110 to calculate transportation cost, the processing device 110 uses another server or the like as needed in accordance with information on the supply location and the place of reuse site of used secondary batteries.

The processing device 110 updates the reuse plan over preset sections (step S380) to update the reuse plan of used secondary batteries.

In step S390, the processing device 110 stores the updated reuse plan of used secondary batteries in the database 100 that is a storage device. In step S400, the processing device 110 informs the vehicle dealer 80, to which the vehicles 20 are delivered, of the reuse plan in the latest set period via the communication network 4 and also informs the carrier 70 and ends the process. In the server 10, such making and updating a reuse plan are performed at intervals of a set period. Since battery performance information and the like of the secondary batteries 200 and secondary batteries 300 temporally change and are constantly updated, a reuse plan is also updated each time the reuse plan is made.

Reuse of secondary batteries 200 based on such a reuse plan will be described with reference to FIG. 1. When vehicles 20 are driven to the vehicle dealer 80 due to lease-up, the vehicle dealer 80 removes secondary batteries 200 from the vehicles 20 to provide used secondary batteries 220. The carrier 70 collects the used secondary batteries 220 from the vehicle dealer 80 in accordance with the reuse plan and, in some cases, collects new secondary batteries 400 from the battery manufacturer 60 and then transports the secondary batteries to the user 30, the user 40, the user 50, and the like. The user 30 reuses the used secondary batteries 220 as replacement secondary batteries for electrical storage devices. The user 40 uses the used secondary batteries 220 as at least part of each of new electrical storage device secondary batteries. The user 50 uses the used secondary batteries 220 as at least part of each of new vehicle-mounted secondary batteries.

Oversupplied used secondary batteries 220 may be kept as needed or allocated to the expansion slots of the electrical storage device of the user 30 or may be stocked as a spare for the other users 40, 50. Secondary batteries or part of each of the secondary batteries with unreusable battery performance is discarded after possible recycling.

With the above-described system 2, in accordance with the lease-up time of the vehicle 20 on which the secondary battery 200 is mounted, the lease-up time, that is, the time when the secondary battery 200 is supplied as the used secondary battery 220, is acquired in advance. By monitoring the battery performance information of the secondary battery 200, the battery performance of the used secondary battery 220 to be supplied can also be predicted in advance and acquired. At the same time, the number of used secondary batteries 220 with predetermined battery performance and the locations of the used secondary batteries 220 can be acquired.

In this way, since potential supply of used secondary batteries 220 can be predicted, not only a production plan, such as the amount of production, production region, and the like of secondary batteries but also a reuse plan can be made.

The system 2 is able to acquire in advance the supply time of the used secondary battery 220, the battery performance of the secondary battery 220 to be supplied, and the supply amount can be acquired in advance, so the balance among expected demand time of secondary batteries, battery performance needed, and the demand amount may be adjusted in advance. In other words, when there are some redundant used secondary batteries 220, allocation to various reuse sites is planned in advance; whereas, when there is a shortage of used secondary batteries 220, production of new secondary batteries 400 can be planned in advance.

Since the system 2 is able to acquire the supply locations of used secondary batteries 220 in advance, allocation of reuse sites of used secondary batteries can be planned in accordance with estimated demand locations of secondary batteries from the viewpoint of suppressing transportation cost. Thus, secondary batteries are reused while energy consumption is reduced.

With the system 2, it is possible to adjust the balance between supply and demand of used secondary batteries 220, so occurrence of excessive used secondary batteries 220 is suppressed, with the result that storage cost for the used secondary batteries 220 is reduced. A shutdown and the like of an electrical storage device due to a shortage of used secondary batteries 220 is suppressed, so stable operation of an electrical storage device and the like is possible.

With the system 2, the server 10 acquires information on the battery performance of secondary batteries of an electrical storage device of the user 30, which is a reuse site of used secondary batteries 220, at intervals of a set period and predicts the life (replacement time), so it is possible to highly accurately predict the demand times of secondary batteries. Therefore, it is possible to further appropriately adjust the demand-and-supply balance.

With the system 2, a used secondary battery 220 is allocated to the user 30 or the like and is used as a new secondary battery 300. The server 10 has already acquired the information on the battery performance of the secondary battery 300, so the server 10 is able to predict a decrease in the temporal battery performance and the life of the secondary battery 300 with higher accuracy when the battery performance of the secondary battery 300 is being monitored or with high accuracy even without being monitored.

The process in the server 10 and the flow of the used secondary batteries 220 according to the embodiment are an example of the system 2. The process and the like that the system 2 can perform may be changed as needed and the following modes are possible.

In the above-described embodiment, the system 2 makes a reuse plan by setting the lease-up time of a leased vehicle 20 for the supply time of the secondary battery 200; however, the configuration is not limited. The supply time of the secondary battery 200 may be set in accordance with other information. For example, a subscription is also applicable. Even when a vehicle does not involve a lease or a subscription, the time to buy a new vehicle type and/or vehicle estimated from the category of a user may be set for the supply time or the time to buy a new vehicle based on vehicle purchase history of a user of a vehicle may be set for the supply time. In addition, a method and time that the server 10 acquires the supply time of the secondary battery 200 are not limited. The supply time of the secondary battery 200 can be finally acquired by the server 10 from the vehicle 20 or its user and the vehicle dealer 80.

In the above-described embodiment, the system 2 is configured such that the server 10 receives information on the battery performance of the secondary batteries 200, 300 from the vehicle 20 and the computer 32 at intervals of a set period; however, the configuration is not limited thereto. The server 10 may make inquiry about the battery performance information as needed. Alternatively, the battery performance information may be acquired from an external database related to the battery performance of the secondary batteries 200, 300.

In the above-described embodiment, the system 2 is configured such that the server 10 acquires information on the battery performance of the secondary battery 300 installed in the electrical storage device of the user 30, which is a reuse site of the used secondary battery 220, at intervals of a set period and predicts and sets the demand time from its life. Alternatively, the server 10 may set demand time from the life predicted from the basic information of the secondary battery 300 without acquiring the battery performance of the secondary battery 300.

In the above-described embodiment, the system 2 predicts the life of the secondary battery 300 and makes a reuse plan to replace a secondary battery of which the life expires in a set period with the used secondary battery 220. In other words, demand information of a secondary battery is generated with reference to the life of the secondary battery 300; however, the configuration is not limited thereto. For example, with reference to the supply time of a used secondary battery 220, the battery performance of the secondary battery 300 at that time may be predicted to allocate a secondary battery for replacement. Thus, a secondary battery 300 of which the life has not expired can be a site to which a used secondary battery 220 is allocated.

In the above-described embodiment, the system 2 may be configured to make a supply schedule of used secondary batteries for each rank of battery performance and make a demand schedule of secondary batteries for each rank of battery performance and then adjust the supply-and-demand balance by comparing the supply schedule with the demand schedule. However, the comparison and adjustment are just an example. Other various comparisons and adjustments are applicable.

In the above-described embodiment, the system 2 sets reuse sites of used secondary batteries 220 to the user 30, the user 50 that is a vehicle manufacturer, and the user 40 that is an electrical storage device manufacturer; however, the configuration is not limited thereto. Reuse sites may be set as needed to business operators that use secondary batteries for repair and replacement of secondary batteries of vehicles, individual electrical storage device users, and the like.

In the above-described embodiment, to allocate the reuse sites of used secondary batteries 220, the system 2 allocates the used secondary batteries 220 to the electrical storage device of the user 30 first and then allocates the used secondary batteries 220 to secondary batteries for the electrical storage device of the user 40 and vehicle-mounted secondary batteries for the user 50; however, the configuration is not limited thereto. For the users 30, 40, 50, allocation may be performed without ranking or the order may be changed as needed.

In the above-described embodiment, the system 2 executes the process of updating a reuse plan in accordance with a transportation cost; however, the process may be omitted.

In the above-described embodiment, the server 10 includes at least one processor and a memory. Alternatively, the server 10 may be made up of a plurality of processors. The server 10 functionally includes the database 100 and the processing device 110. Alternatively, the database 100 and the processing device 110 may be servers, respectively.

In the above-described embodiment, the system 2 is a secondary battery reuse support system, and the server 10 is a server used in the reuse support system. According to the disclosure, a reuse support system for a secondary battery is also described as an embodiment. In the reuse support system, a component of part of the system 2, that is, at least one processor acquires supply time information on the supply time of a used secondary battery 220 that will be removed from the vehicle 20 and first battery performance information on the battery performance of a secondary battery 200 mounted on a vehicle 20 and generates supply information on supply of the used secondary battery, including the battery performance of the used secondary battery 220 at the supply time, in accordance with the supply time information and the first battery performance information. The system 2 include all the modes described as the reuse support system for a secondary battery and the server.

A server to support reuse of a secondary battery is also described as an embodiment. The server includes, as components of part of the server 10, that is, a database that stores supply time information on the supply time of a used secondary battery 220 that will be removed from a vehicle 20, and first battery performance information on the battery performance of a secondary battery 200 mounted on the vehicle 20, and a processing device that generates supply information on supply of the used secondary batteries, including the battery performance of the used secondary battery 220 at the supply time, in accordance with the supply time information and the first battery performance information. The server includes all the modes described as the reuse support system for a secondary battery and the server.

According to the disclosure, a method to support reuse of a secondary battery mounted on a vehicle is also described. In other words, a method is described as an embodiment. The method includes acquiring, by at least one processor, supply time information on supply time of a used secondary battery 220 that will be removed from a vehicle 20 and first battery performance information on battery performance of the secondary battery 200 mounted on the vehicle 20, and generating, by the at least one processor, supply information on supply of the used secondary battery, including battery performance of the used secondary battery 220 at the supply time, in accordance with the supply time information and the first battery performance information. The method include all the modes described as the reuse support system for a secondary battery and the server.

The embodiments of the technology have been described in detail above; however, these are only illustrative and are not intended to limit the appended claims. The technology described in the appended claims also encompasses various modifications and changes from the specific examples illustrated above. The technical elements described in the specification or the drawings exhibit technical usability solely or in various combinations and are not limited to combinations of the appended claims at the time of filing the application. The technology illustrated in the specification and drawings can achieve multiple purposes at the same time and has technical usability by achieving one of those purposes.

What is claimed is:

1. A system to support reuse of a mounted secondary battery mounted on a vehicle, the system comprising:
at least one processor, wherein:
the at least one processor is configured to
acquire supply time information on supply time of a used secondary battery that will be removed from the vehicle and first battery performance information on battery performance of the mounted secondary battery mounted on the vehicle,
generate supply information on supply of the used secondary battery, including battery performance of the used secondary battery at the supply time, in accordance with the supply time information and the first battery performance information,
acquire demand information on demand for a reuse secondary battery, including battery performance of the reuse secondary battery that will be needed at demand time of the reuse secondary battery from a secondary battery reuse user,
perform a comparison of the supply information and the demand information,
make a reuse plan to allocate the used secondary battery to the reuse secondary battery for the secondary battery reuse user to reuse based on the comparison,
determine an excess or shortage of supply and demand at each of a plurality of time periods based on the comparison, and
update the reuse plan based on the determined excess or shortage of supply and demand.

2. The system according to claim 1, wherein:
the at least one processor is configured to acquire second battery performance information on battery performance of the reuse secondary battery that will be used by the secondary battery reuse user; and
the at least one processor is configured to generate the demand information in accordance with the second battery performance information.

3. The system according to claim 1, wherein the at least one processor is configured to make the reuse plan including producing a new secondary battery, when the used secondary battery is insufficient as a result of comparing the supply information with the demand information.

4. The system according to claim 1, wherein the at least one processor is configured to make the reuse plan in consideration of transportation cost to be incurred between a supply location of the used secondary battery and a demand location of the reuse secondary battery from the secondary battery reuse user.

5. The system according to claim 1, wherein the vehicle includes a leased vehicle, and the supply time information includes information based on time that the lease expires.

6. The system according to claim 1, wherein the secondary battery reuse user includes a user that uses the used secondary battery in at least a stationary electrical storage device.

7. A server to support reuse of a mounted secondary battery mounted on a vehicle, the server comprising:
a database configured to:
store supply time information on supply time of a used secondary battery that will be removed from the vehicle and first battery performance information on battery performance of the mounted secondary battery mounted on the vehicle, and store demand information on demand for a reuse secondary battery, including battery performance of the reuse secondary battery that will be needed at demand time of the reuse secondary battery from a secondary battery reuse user; and an information processing device configured to:

generate supply information on supply of the used secondary battery, including battery performance of the used secondary battery at the supply time, in accordance with the supply time information and the first battery performance information, acquire the demand information on the demand for the reuse secondary battery, including the battery performance of the reuse secondary battery that will be needed at the demand time of the reuse secondary battery from the secondary battery reuse user, perform a comparison of the supply information and the demand information, make a reuse plan to allocate the used secondary battery to the reuse secondary battery for the secondary battery reuse user to reuse base on the comparison, determine an excess or shortage of supply and demand at each of a plurality of time periods based on the comparison, and update the reuse plan based on the determined excess or shortage or supply and demand.

8. A method to support reuse of a mounted secondary battery mounted on a vehicle, the method comprising:

acquiring, by at least one processor, supply time information on supply time of a used secondary battery that will be removed from the vehicle and first battery performance information on battery performance of the mounted secondary battery mounted on the vehicle;

generating, by the at least one processor, supply information on supply of the used secondary battery, including battery performance of the used secondary battery at the supply time, in accordance with the supply time information and the first battery performance information;

acquiring, by the at least one processor, demand information on demand for a reuse secondary battery, including battery performance of the reuse secondary battery that will be needed at demand time of the reuse secondary battery from a secondary battery reuse user;

performing, by the at least one processor, a comparison of the supply information and the demand information;

making, by the at least one processor, a reuse plan to allocate the used secondary battery to the reuse secondary battery for the secondary battery reuse user to reuse based on the comparison;

determining, by the at least one processor, an excess or shortage of supply and demand at each of a plurality of time periods based on the comparison; and updating, by the at least one processor, the reuse plan based on the determined excess or shortage of supply and demand.

* * * * *